(12) United States Patent
Azami

(10) Patent No.: US 12,035,221 B2
(45) Date of Patent: Jul. 9, 2024

(54) CONTROL APPARATUS AND CONTROL METHOD

(71) Applicant: JVCKENWOOD Corporation, Yokohama (JP)

(72) Inventor: Tomohiro Azami, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/218,327

(22) Filed: Jul. 5, 2023

(65) Prior Publication Data

US 2024/0015635 A1 Jan. 11, 2024

(30) Foreign Application Priority Data

Jul. 6, 2022 (JP) .................................. 2022-108934
Apr. 4, 2023 (JP) .................................. 2023-060651

(51) Int. Cl.
*H04W 48/02* (2009.01)
*H04W 8/18* (2009.01)

(52) U.S. Cl.
CPC ............. *H04W 48/02* (2013.01); *H04W 8/18* (2013.01)

(58) Field of Classification Search
CPC ................................ H04W 8/18; H04W 48/02
See application file for complete search history.

(56) References Cited

U.S. PATENT DOCUMENTS

| 11,615,170 | B1 * | 3/2023 | Guerra | G06F 21/62 |
| | | | | 726/28 |
| 2016/0087942 | A1 | 3/2016 | Yaguchi et al. | |
| 2016/0198394 | A1 * | 7/2016 | Heikkilä | H04W 48/16 |
| | | | | 370/328 |
| 2017/0093831 | A1 * | 3/2017 | Chudy | H04L 63/10 |
| 2021/0232698 | A1 * | 7/2021 | Hayashi | G06F 21/6218 |
| 2023/0121384 | A1 * | 4/2023 | Bogatin | H04L 67/1095 |
| | | | | 709/219 |
| 2023/0209346 | A1 * | 6/2023 | Gladish | H04W 12/08 |
| | | | | 726/9 |

FOREIGN PATENT DOCUMENTS

JP 2016063417 A 4/2016

* cited by examiner

*Primary Examiner* — Kostas J Katsikis
(74) *Attorney, Agent, or Firm* — Procopio, Cory, Hargreaves & Savitch LLP

(57) ABSTRACT

A control apparatus is provided that includes: a communication unit configured to receive an access request transmitted from a first user; an analysis unit configured to analyze whether a second user whose use frequency of a network is equal to or higher than a threshold approves the access request by the first user or not; and a control unit configured to permit access by the first user to the network in a case where the access request by the first user is approved by a specific number or more of the second users, the specific number being two or more.

6 Claims, 9 Drawing Sheets

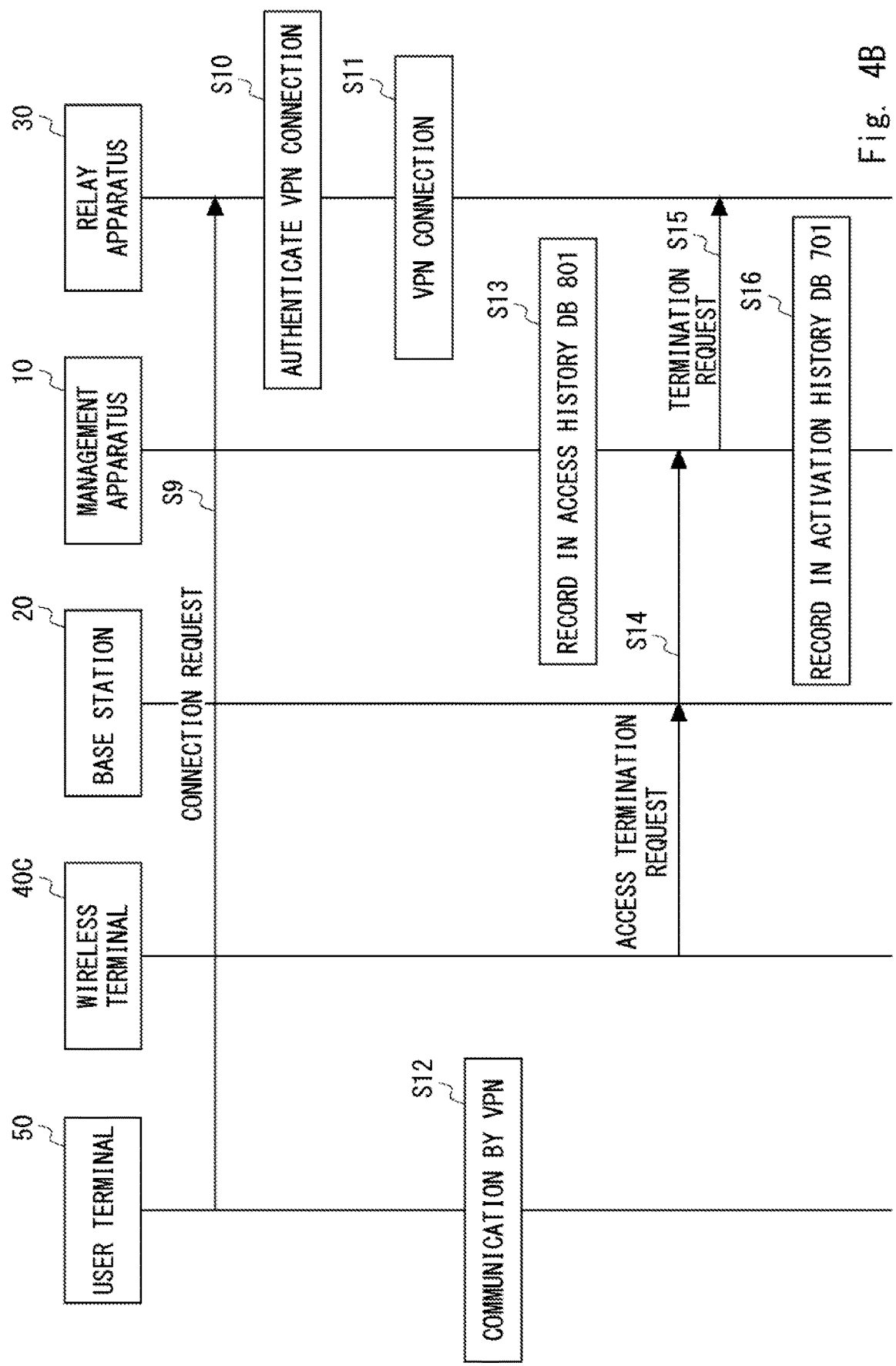

| AUTHORIZATION TARGET USER ID | AUTHORIZATION SETTER USER ID | AUTHENTICATION INFORMATION | SETTING DATE AND TIME |
|---|---|---|---|
| USER C | USER A | AUTHENTICATION INFORMATION C | SETTING DATE AND TIME A |
| USER C | USER B | AUTHENTICATION INFORMATION C | SETTING DATE AND TIME B |
| ... | ... | ... | ... |

Fig. 5

| USER ID | USER TYPE |
|---------|-----------|
| USER A | FREQUENT USER |
| USER B | FREQUENT USER |
| USER C | TYPICAL USER |
| USER D | ADMINISTRATOR |
| ... | ... |

| CONTROL TYPE | CONTROL USER ID | CONTROL DATE AND TIME |
|---|---|---|
| ACTIVATE | USER C | CONTROL DATE AND TIME A |
| STOP | USER C | CONTROL DATE AND TIME B |
| ... | ... | ... |

Fig. 7

| USER NAME | ACCESS START DATE AND TIME | ACCESS TERMINATION DATE AND TIME |
|---|---|---|
| USER C | ACCESS START DATE AND TIME A | ACCESS TERMINATION DATE AND TIME B |
| ... | ... | ... |

CONTROL APPARATUS AND CONTROL METHOD

CROSS REFERENCE TO RELATED APPLICATION

This application is based upon and claims the benefit of priority from Japanese patent application No. 2022-108934, filed on Jul. 6, 2022 and Japanese patent application No. 2023-060651, filed on Apr. 4, 2023 the disclosure of which is incorporated herein in its entirety by reference.

BACKGROUND

The present disclosure relates to a control apparatus, and a control method.

Conventionally, a technique of allowing a user permitted by an administrator or the like to access an internal network from an external network using a VPN (Virtual Private Network) or the like has been known (for example, see Japanese Unexamined Patent Application Publication No. 2016-63417).

However, according to the related art, the user cannot appropriately access the network in some cases: for example, if the administrator is absent, access permission cannot be obtained.

SUMMARY

A first aspect according to the present disclosure provides a control apparatus including: a communication unit configured to receive an access request transmitted from a first user; an analysis unit configured to analyze whether at least one second user whose use frequency of a network is equal to or higher than a threshold approves the access request by the first user or not; and a control unit configured to permit access by the first user to the network in a case where the access request by the first user is approved by a specific number or more of the second users, the specific number being two or more.

A second aspect according to the present disclosure provides a control method including: receiving an access request transmitted from a first user; analyzing whether at least one second user whose use frequency of a network is equal to or higher than a threshold approves the access request by the first user or not; and permitting access by the first user to the network in a case of where access by the first user is approved by a specific number or more of the second users, the specific number being two or more.

According to one aspect, access to the network can be appropriately controlled.

BRIEF DESCRIPTION OF THE DRAWINGS

The above and other aspects, advantages and features will be more apparent from the following description of certain embodiments taken in conjunction with the accompanying drawings, in which:

FIG. 4B is a sequence diagram showing an example of the processes of the communication system according to the embodiment;

FIG. 5 shows an example of an activation authorization DB according to the embodiment;

FIG. 6 shows an example of a user type DB according to the embodiment;

FIG. 7 shows an example of an activation history DB according to the embodiment; and FIG. 8 shows an example of an access history DB according to the embodiment.

DETAILED DESCRIPTION

Figure 1:
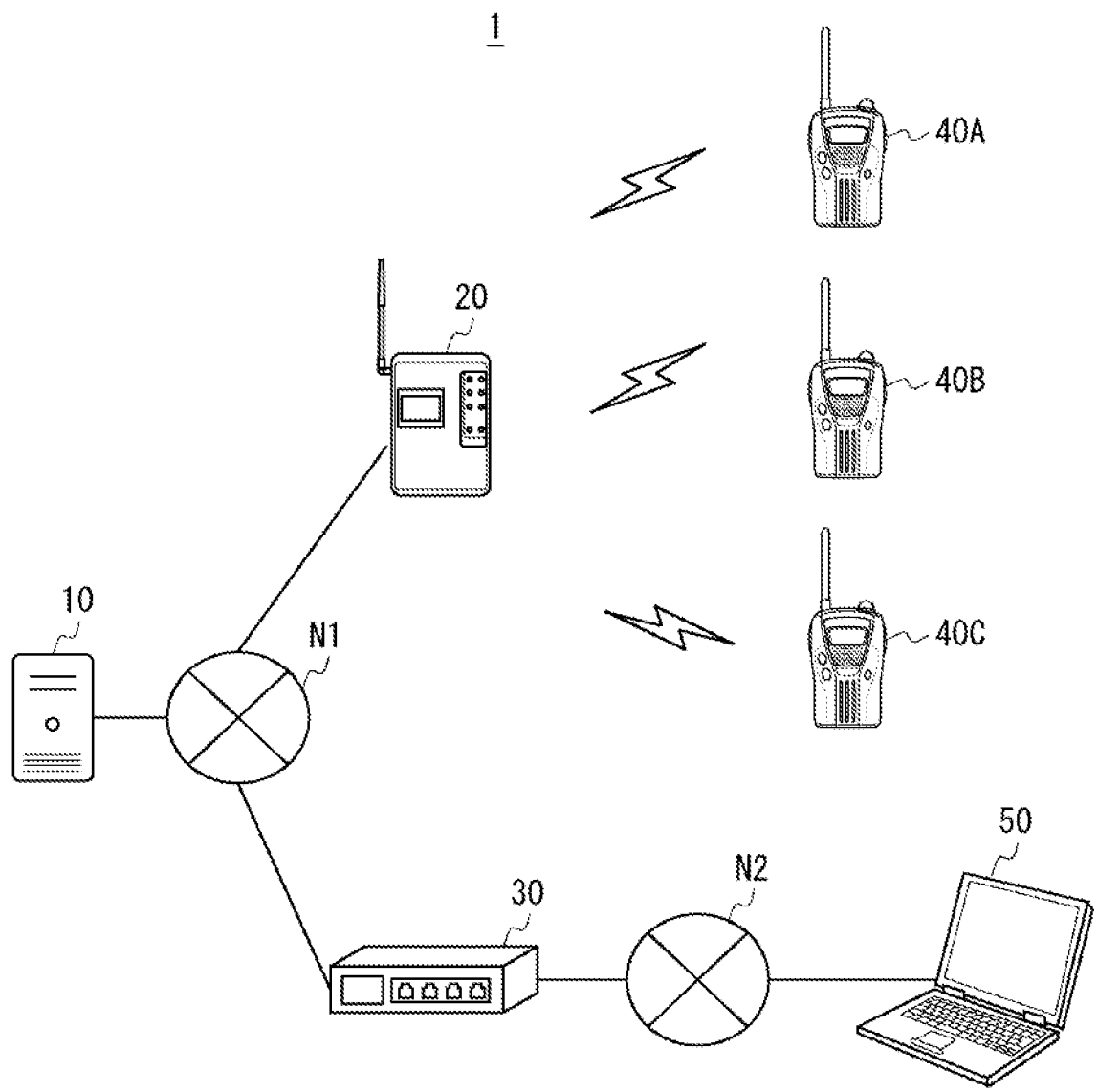
FIG. 1 shows an example of a configuration of a communication system according to an embodiment.

The principle of the present disclosure is described with reference to some embodiments illustrated as examples. It should be noted that these embodiments are described only for the purpose of example, and are to help those skilled in the art understand and implement the present disclosure without any suggestion of limitation about the scope of the present disclosure. The disclosure described in the present specification may also be implemented by various methods other than those described below.

In the following description and the scope of the claims, unless otherwise defined, all the technical terms and scientific terms used in the present specification have the same meanings generally understood by those skilled in the art in the technical field to which the present disclosure belongs.

Hereinafter, referring to the drawings, embodiments of the present disclosure are described.

System Configuration

Referring to FIG. 1, the configuration of a communication system 1 according to an embodiment is described. FIG. 1 shows a configuration example of the communication system 1 according to the embodiment. In the example in FIG. 1, the communication system 1 includes a management apparatus 10, a base station 20, a relay apparatus 30, a wireless terminal 40A, a wireless terminal 40B, a wireless terminal 40C, and a user terminal 50. Hereinafter, if there is no need to discriminate the wireless terminal 40A, the wireless terminal 40B, and the wireless terminal 40C from each other, they are each simply called "wireless terminal 40". Note that the numbers of management apparatuses 10, base stations 20, relay apparatuses 30, wireless terminals 40, and user terminals 50 are not limited to those in the example in FIG. 1.

In the example in FIG. 1, the management apparatus 10, the base station 20, and the relay apparatus 30 are communicably connected to each other by a network N1, such as a LAN (Local Area Network) or a bus. The network N1 may include, for example, an internal network (in-house LAN) operated by a company or the like. The base station 20 and the wireless terminal 40 wirelessly communicate with each other. The wireless communication of the present disclosure includes, for example, near field communication, such as dedicated radio (institutional radio), wireless LAN, and BLE (Bluetooth (R) Low Energy), and a mobile communication system. Examples of the dedicated radio may include radio for institutional information transmission, such as police radio, fire radio, disaster warning radio, railway radio, ship radio, and military radio. Examples of the mobile communication system may include, for example, the sixth-generation mobile communication system (6G), the fifth-generation mobile communication system (5G), the fourthgeneration mobile communication system (4G), and the third-generation mobile communication system (3G).

The user terminal 50 is communicably connected to the base station 20 via an external network N2 and a relay apparatus 30. Examples of the external network N2 may include, for example, the Internet (WAN: Wide Area Network).

The management apparatus 10 manages access by a user from the external network N2 to the network N1. The base station 20 is an apparatus that performs wireless communication with the wireless terminal 40. The base station 20 may be, for example, a relay station (repeater) for dedicated radio. In this case, the base station 20 may perform half-duplex communication (semi-duplex) with which the wireless terminal 40 that is, for example, a push-to-talk terminal (specified low power transceiver) performs mutual communication using a channel for transmission and a channel for reception via the base station 20. In this case, the base station 20 may convert radio waves received in a certain channel (channel for transmission) into another channel (channel for reception), and relay the radio waves.

The base station 20 may be an access point of a wireless LAN or the like. The base station 20 may be an NR (New Radio) base station (gNB) in a mobile communication system, an eNB (evolved NodeB) or the like.

The relay apparatus 30 may be, for example, a router or the like that has a VPN (Virtual Private Network) function. In this case, the relay apparatus 30 may achieve a VPN using, for example, IPsec-VPN that performs encryption and authentication on the network layer (layer 3), SSL-VPN that performs encryption and authentication through SSL (Secure Socket Layer) encryption communication, which is that on the session layer (layer 5), or L2VPN that performs encryption and authentication on the SSL and performs encapsulation and communication on the data link layer (layer 2).

The wireless terminal 40 may be a push-to-talk terminal (specified low power transceiver) that uses dedicated radio. The wireless terminal 40 may be, for example, a smartphone, a tablet terminal, a personal computer or the like that uses a wireless LAN, near field communication, or a mobile communication system.

The user terminal 50 is a terminal used by the user to access the network N1 from the external network N2. The user terminal 50 may be, for example, a personal computer, a smartphone or the like.

Hardware Configuration

Figure 2:
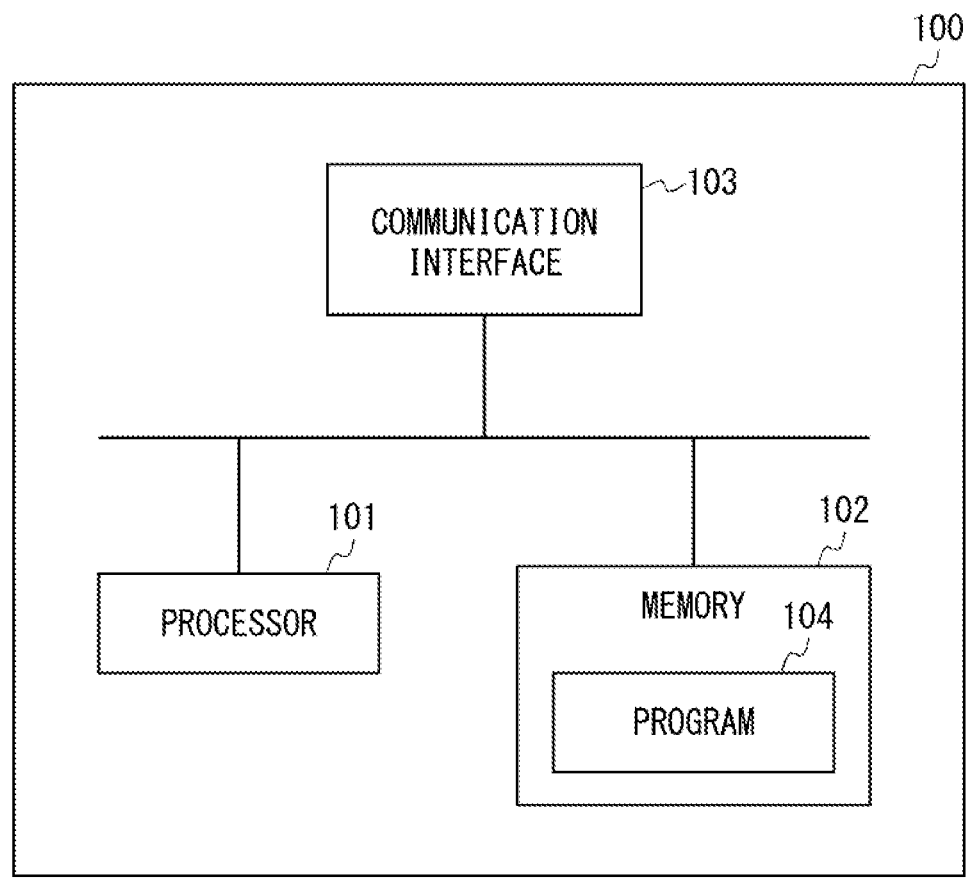
FIG. 2 shows a hardware configuration example of a management apparatus according to the embodiment.

FIG. 2 shows a hardware configuration example of a computer 100 that is the management apparatus 10 according to the embodiment. In the example in FIG. 2, the computer 100, which is the management apparatus 10, includes a processor 101, a memory 102, and a communication interface 103. These components may be connected to each other via a bus or the like. The memory 102 stores at least part of a program 104. The communication interface 103 includes an interface required for communication with another network element.

The program 104 is executed by cooperation between the processor 101, the memory 102 and the like, which perform at least part of the embodiment of the present disclosure by the computer 100. The memory 102 may be a non-transitory computer-readable storage medium, as an example without limitation. The memory 102 may be implemented using any appropriate data storage technique, such as of a semiconductor-based memory device, a magnetic memory device and system, an optical memory device and system, a permanent memory, and a removable memory. In the computer 100, only one memory 102 is shown. However, some physically different memory modules may exist in the computer 100. The processor 101 may be of any type. The processor 101 may include one or more of a general-purpose computer, a dedicated computer, a microprocessor, a digital signal processor (DSP) or, as an example without limitation, a processor based on a multi-core processor architecture. The computer 100 may include a plurality of processors, such as application-specific integrated circuits temporally belonging to a clock with which the main processor is synchronized.

The embodiment of the present disclosure can be implemented by hardware or a dedicated circuit, software, a logic, or any combination of them. Some aspects may be implemented by hardware. On the other hand, other aspects may be implemented by firmware or software that can be executed by a controller, a microprocessor or another computing device.

The present disclosure provides at least one computer program product stored in a non-transitory computer-readable storage medium in a tangible manner. The computer program product includes computer-executable instructions, such as instructions included in a program module, which are executed by a device on an actual processor or a virtual processor of a target, thus executing a process or a method of the present disclosure. The program module includes routines, programs, libraries, objects, classes, components, data structures and the like for executing specific tasks, and implementing specific abstract data types. The functions of the program modules may be combined or divided among the program modules as desired in various embodiments. Machine-executable instructions of the program module can be executed locally or in a distributed device. In the distributed device, the program modules can be arranged in both of local and remote storage media.

Program code for executing a method of the present disclosure may be written in any combination of one or more programming languages. The program code is supplied to a processor or a controller of a general-purpose computer, a dedicated computer or another programmable data processing apparatus. When the program code is executed by the processor or the controller, functions/operations in flowcharts and/or block diagrams to be implemented are executed. The program code is completely executed on the machine. Part of the code is executed on the machine as a standalone software package, part of the code is executed on the machine, part of the code is executed on a remote machine, or part of the code is executed completely on the remote machine or a server.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Configuration

Figure 3:
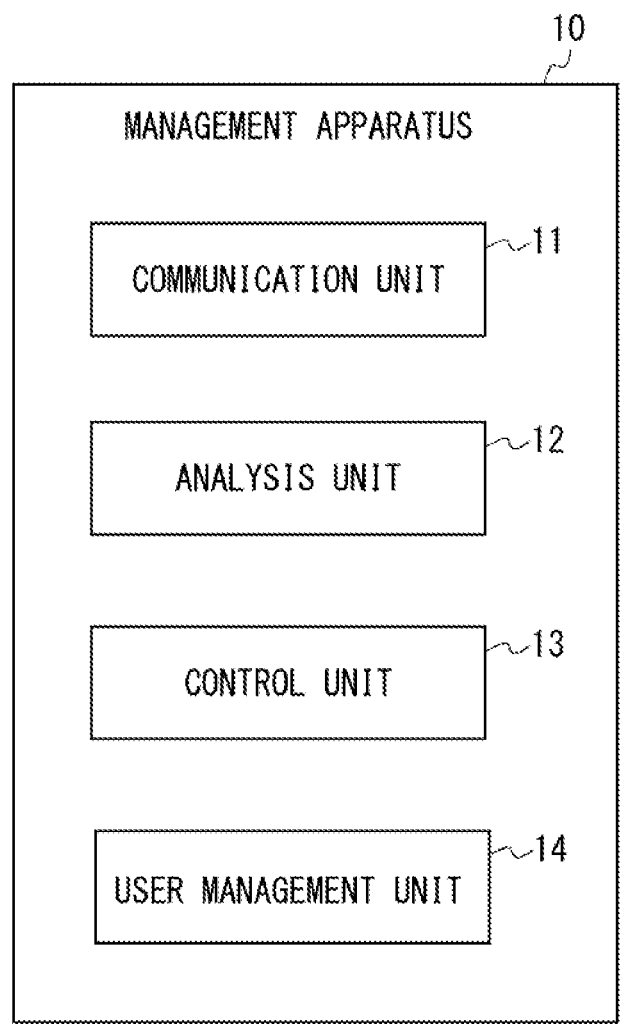
FIG. 3 shows an example of the configuration of the management apparatus according to the embodiment.

Referring to FIG. 3, the configuration of the management apparatus 10 according to the embodiment is described. FIG. 3 shows an example of the configuration of the management apparatus 10 according to the embodiment. In the example in FIG. 3, the management apparatus 10 includes a communication unit 11, an analysis unit 12, a control unit 13, and a user management unit 14. These components may be achieved by cooperation between one or more programs installed in the management apparatus 10, and hardware, such as the processor 101 and memory 102, in the management apparatus 10.

The communication unit 11 communicates with the base station 20 and the relay apparatus 30 via the network N1. The communication unit 11 receives, via the base station 20, various requests transmitted from the wireless terminal 40. The communication unit 11 receives, for example, an access request and the like transmitted from a first user (hereinafter also called a typical user). The analysis unit 12 performs various analyses (determination), based on information received by the communication unit 11. For example, the analysis unit 12 analyzes whether access by the first user is approved or not by a plurality of second users (hereinafter also called frequent users) whose use frequency of the network N1 is equal to or higher than a threshold.

The control unit 13 performs various types of control for the relay apparatus based on an analysis by the analysis unit 12. For example, when the access by the first user is approved by a specific number or more of second users, the control unit 13 performs control so that the first user can access the network N1. The user management unit 14 authorizes the user type indicating whether the user is the first user (typical user) or the second user (frequent user), based on the user frequency of the network N1. According to this embodiment, access to the network can be appropriately controlled.

Processes

Figure 4A:
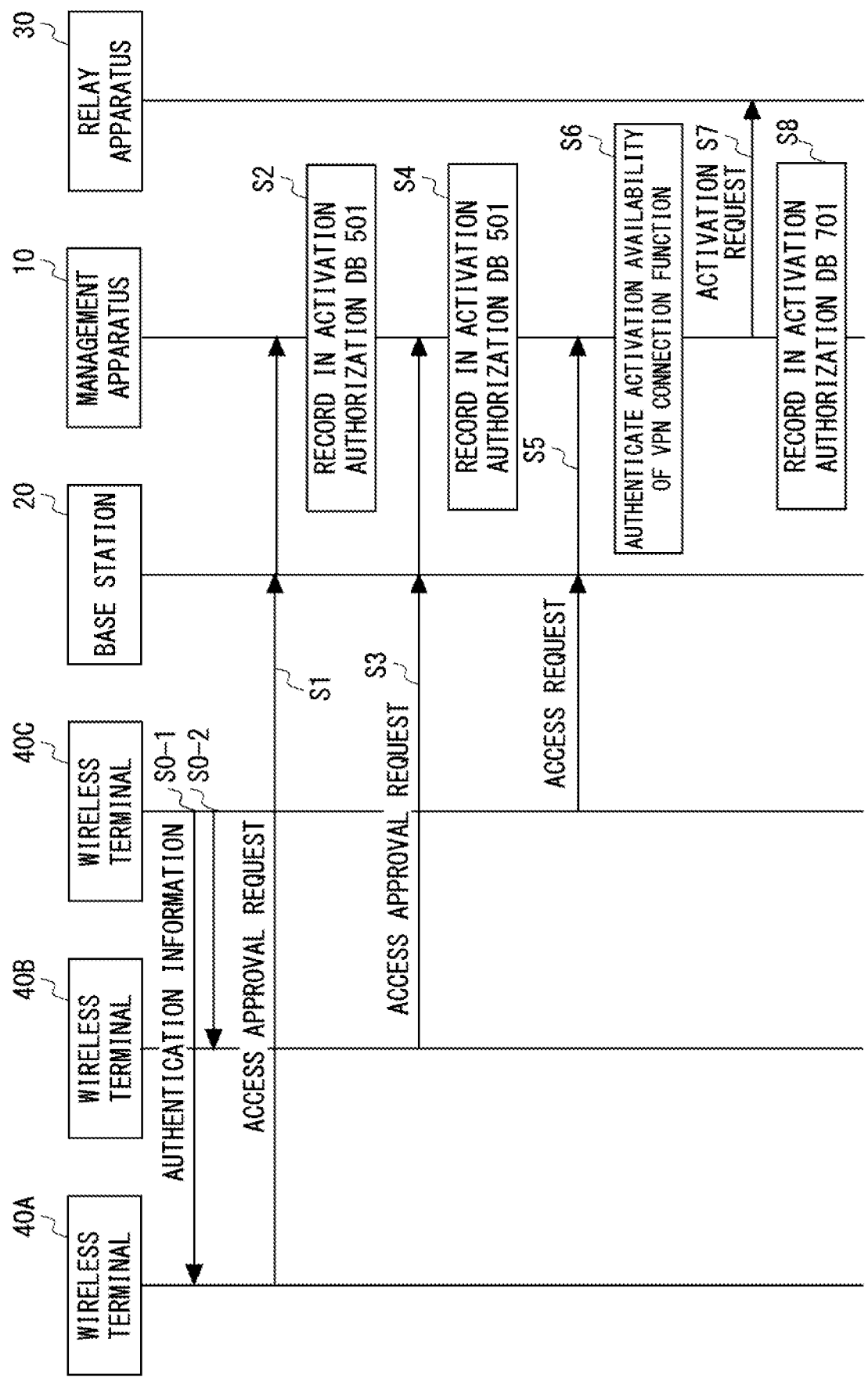
FIG. 4A is a sequence diagram showing an example of processes of the communication system according to the embodiment.

Next, referring to FIGS. 4A to 8, an example of a process of the communication system 1 according to the embodiment is described. FIGS. 4A and 4B are sequence diagrams indicating an example of the process of the communication system 1 according to the embodiment. FIG. 5 shows an example of an activation authorization DB (database) 501 according to the embodiment. FIG. 6 shows an example of a user type DB 601 according to the embodiment. FIG. 7 shows an example of an activation history DB 701 according to the embodiment. FIG. 8 shows an example of an access history DB 801 according to the embodiment.

Note that the order of the following processes may be appropriately changed in a range without causing contradiction. At least part of processes among the following processes may be omitted.

Hereinafter, users of the wireless terminals 40A to 40C are respectively called users A to C, and a case where the user C permitted by the users A and B accesses the network N1 from the external network N2 is described as an example. Note that the users A and B are examples of "second users", and the user C is an example of "first user".

In steps S0-1 and S0-2, the wireless terminal 40C notifies each of the wireless terminals 40A and 40B of authentication information (e.g., password, or pass code) for the user C, and of an user ID (identification information) and the like of the user C serving as an authorization target. The authentication information may be transmitted from the user C to the users A and B by transmission means, such as phone, email, or orality, for example. The user ID of the present disclosure may be, for example, an originating and receiving phone number of the wireless terminal 40, an ID of the wireless terminal 40, an ID of an account of the user, etc.

Subsequently, in response to operation by the user A, the wireless terminal 40A transmits an access approval request to the management apparatus 10 via the base station 20 (step S1). Here, for example, the wireless terminal 40A may transmit authentication information where the user A is designated by the user C, the user ID of the user A, and an access approval request that includes the user ID of the user C as an authorization target user ID, through wireless communication.

Subsequently, the analysis unit 12 of the management apparatus 10 records, in the activation authorization DB 501, information that is based on the access approval request and has been received by the base station 20 (step S2). In the example in FIG. 5, the activation authorization DB 501 stores data on a combination of the authorization target user ID, an authorization setter user ID, authentication information, and setting date and time. Note that the activation authorization DB 501 may be recorded in the storage device in the management apparatus 10, or the storage device out of the management apparatus 10.

The authorization target user ID is the user ID of the user (e.g., user C) serving as an authorization target. The authorization setter user ID is the user ID of user (e.g., user A) having performed setting of authorization. The setting date and time is a date and time when setting of the authentication was performed. The setting date and time may be a date and time when the management apparatus 10 received the access approval request. Note that if predetermined time period (e.g., 24 hours) elapses after the setting date and time of the record, the analysis unit 12 may remove the record.

Subsequently, in response to operation by the user B, the wireless terminal transmits the access approval request to the management apparatus 10 via the base station 20 (step S3). Subsequently, the management apparatus 10 records, in the activation authorization DB 501, information based on the access approval request received by the base station 20 (step S4). Note that the processing details of steps S3 and S4 may be similar to those of steps S1 and S2.

Subsequently, in response to operation by the user C, the wireless terminal transmits the access request to the management apparatus 10 via the base station 20 (step S5). Here, the wireless terminal 40C may first accept input operation, such as of authentication information for the user C, from the user C. The wireless terminal 40C may transmit, for example, the access request that includes the authentication information, and the user ID of the user C, through wireless communication.

Subsequently, the analysis unit 12 refers to the activation authorization DB 501 and user type DB 601, performs authorization about the activation availability (the access availability of the user C to the network N1) of the VPN connection function (an example of "wired communication function") of the relay apparatus 30 (step S6). In the example in FIG. 6, the user type DB 601 stores the user type in association with the user ID. Note that the user type DB 601 may be recorded in the storage device in the management apparatus 10, or in the storage device outside of the management apparatus 10.

The user type is a type about the authentication authority. The user type includes "administrator", "frequent user" (approvable party), and "typical user".

The "administrator" is, for example, a system administrator set in advance, and indicates a user having an authority of solely approving other users who have issued an access request for VPN connection. The "frequent user" indicates, for example, a user having a frequency of using the VPN connection function equal to or higher than a threshold (e.g., 5). The frequency may be, for example, the number of uses of the VPN connection function in a predetermined time period (e.g., most recent one-month period). The "typical user" indicates, for example, a user having a frequency of using the VPN connection function less than the threshold. The user management unit 14 authorizes, as frequent users, users having frequencies of using the VPN connection function equal to or higher than the threshold among the users. This unit also authorizes, as typical users, users having frequencies of using the VPN connection function less than the threshold among the users. The user management unit 14 updates the user type DB 601, based on the authorization result.

For example, at timing, such as periodic timing, or at processing of step S6, the user management unit 14 may authorize the user types for the users other than "administrator", and update data in the user type DB 601. For example, the user management unit 14 may adopt the frequency of activating the VPN connection function of the relay apparatus 30 recorded in the after-mentioned activation history DB 701, as the frequency of using the VPN connection function. For example, the user management unit 14 may calculate the frequency of using the VPN connection function, based on the access start date and time recorded in the after-mentioned access history DB 801.

For example, if the authentication information (the authentication information included in the access request) or the like input from the user C who is the authorization target coincides with the authentication information (the authentication information included in the access approval request) or the like set for the user who is "administrator", the analysis unit 12 may determine that the authentication is successful (access is permitted). For example, if the authentication information or the like input from the user C who is the authorization target coincides with pieces of authentication information and the like set respectively for at least a specific number (an integer of two or more; for example, two) or more of users who are "frequent users", the management apparatus 10 may determine that the authentication is successful. Accordingly, for example, even if the administrator is absent or the like, the user having a high use frequency of the VPN connection function can permit another user to use the VPN connection function.

For example, if the authentication information or the like input from a certain user who is an authorization target coincides only with the authentication information or the like set for less than the specific number of users who are "frequent users", the analysis unit 12 may determine that the authentication is unsuccessful (access is denied). For example, if the authentication information or the like input from the user who is the authorization target coincides with the pieces of authentication information set respectively for the specific number of users who are "frequent users", the analysis unit 12 may determine that the authentication is successful. Accordingly, the permission by the user having a high use frequency of the VPN connection function is required. Thus, the security can be improved.

Note that the management apparatus 10 may use the user ID of the user who is the authorization target, besides the authentication information. Note that if the authentication fails, the management apparatus 10 may notify the wireless terminal 40C of the failure. In this case, if the authentication information or the like input from the user C who is the authorization target coincides only with the pieces of authentication information or the like set respectively for less than the specific number of users who are "frequent users", the management apparatus 10 may notify the wireless terminal 40C of the user IDs of the users. Accordingly, for example, the user C can grasp which users he or she prompts for setting among the users requested for setting through email or the like.

On the other hand, if the authentication is successful, the management apparatus 10 transmits, to the relay apparatus 30, an activation request for the VPN connection function for allowing the user to communicate with the base station 20 via the external network N2 (step S7). Accordingly, for example, the VPN connection function is disabled at the normal time, and the VPN connection function can be enabled only when access to the network N1 is required. Thus, the security can be improved.

Here, for example, the management apparatus 10 may transmit a specific command for activating the VPN connection function to the relay apparatus 30 via the network N1 using a protocol, such as HTTPS (Hypertext Transfer Protocol Secure).

The management apparatus 10 may set the VPN connection information for using the VPN connection function, in the relay apparatus 30, based on information about the user C. The VPN connection information may include, for example, information, such as on a user name, a password, and a server name (e.g., the domain name of the relay apparatus 30) for VPN connection. The management apparatus 10 may activate a VPN connection function for each user, with at least one of the user name, password, and the server name being different on a user-by-user basis. In this case, for example, the management apparatus 10 may determine the user name for VPN connection, based on user ID or the like of the user C. In this case, for example, the management apparatus 10 may determine the user name associated with the user C, based on data (correspondence table) or the like on a combination of the user ID and the VPN connection information set in advance. Alternatively, for example, the management apparatus 10 may determine the user name associated with the user C, based on a predetermined conversion rule for converting the user ID into the user name for VPN connection.

For example, the management apparatus 10 may determine the password for VPN connection, based on the authentication information or the like input from the user C. The management apparatus 10 may wirelessly notify the wireless terminal 40C of the VPN connection information via the base station 20.

The management apparatus 10 may wirelessly notify the wireless terminal of the user A having set the authentication information for the user C, and the wireless terminal 40B of the user B, via the base station 20, that the VPN connection function is activated by the user C who is the authorization target.

Subsequently, the management apparatus 10 records, in the activation history DB 701, the activation of the VPN connection function of the relay apparatus 30 (step S8). In the example in FIG. 7, data on a combination of a control type, control user ID, and control date and time are recorded in the activation history DB 701. Note that the activation history DB 701 may be recorded in the storage device in the management apparatus 10, or the storage device outside of the management apparatus 10.

The control type is a type of control for the VPN connection function. The control type may include, for example, activation, and termination. The control user ID is the user ID of the user controlling (activating or terminating) the VPN connection function of the relay apparatus 30. The control date and time is date and time when the VPN connection function of the relay apparatus 30 was activated or terminated. The activation date and time may be, for example, a date and time when the management apparatus 10 received, from the relay apparatus 30, a successful response to the activation request transmitted from the management apparatus 10. Alternatively, the activation date and time may be, for example, a date and time of successful authentication by the process in step S6.

Subsequently, in response to operation by the user C, the user terminal 50 transmits a connection request to the relay apparatus 30 via the external network N2 (step S9). Here, the user terminal 50 may first accept input operation, such as of the VPN connection information or the like including the user name, the password, and the server name, from the user C. For example, the user terminal may transmit a connection request including the user name and the password, to an IP (Internet Protocol) address associated with the server name.

Subsequently, the relay apparatus 30 authenticates VPN connection by the user C to the network N1 (step S10). Here, the relay apparatus 30 may performs authentication for connection to the network N1, based on the received user name, and the password.

If the authentication is successful, the relay apparatus 30 relays communication by VPN between the user terminal 50 of the user C and the internal network N1 (step S11). Subsequently, in response to operation by the user C, the user terminal 50 communicates with an apparatus connected to the network N1 via the external network N2 (step S12). Here, for example, the user C may obtains information for maintenance of the relay apparatus 30 from the base station 20 via the network N1.

Subsequently, the management apparatus 10 records the connection of the user C to network N1, in the access history DB 801 (step S13). In the example in FIG. 8, data on a combination of the user name, the access start date and time, and the access termination date and time is recorded in the access history DB 801. Note that the access history DB 801 may be recorded in the storage device in the management apparatus 10, or recorded in the storage device outside of the management apparatus 10.

The user name is a user name for VPN connection. The access start date and time is a date and time of starting VPN connection. The access start date and time may be a date and time of successful authentication of the process in step S10. The access termination date and time is a date and time of termination of VPN connection. The access termination date and time may be a date and time of log out of the user from the VPN connection function of the relay apparatus 30.

Subsequently, in response to operation by the user C, the wireless terminal transmits an access termination request to the management apparatus 10 via the base station 20 (step S14). Subsequently, the management apparatus 10 transmits, to the relay apparatus 30, an access termination request for the VPN connection function for allowing the user to communicate with the base station 20 via the external network N2 (step S15). Here, for example, the management apparatus 10 may refer to the activation history DB 701, and transmit, to the relay apparatus 30, a termination request for the VPN connection function activated by the user C. Accordingly, for example, when the relay apparatus 30 activates the VPN connection function for the user C, the VPN connection function for the user C can be terminated. Accordingly, the pass code and the like previously used by the user C are not allowed to be used, thus improving the security.

Here, for example, the management apparatus 10 may transmit, a specific command for terminating the VPN connection function, to the relay apparatus 30 via the network N1 using a protocol, such as HTTPS. Note that even if the VPN connection function of the relay apparatus 30 has not been terminated after a predetermined time period (e.g., an hour) has elapsed since the activation date and time, the management apparatus 10 may execute the process in step S15, and terminate the VPN connection function. Subsequently, the management apparatus 10 records the termination of the VPN connection function, in the activation history DB 701 (step S16).

Modification Example

The management apparatus 10 may be an apparatus included in a single housing. However, the management apparatus 10 of the present disclosure is not limited to this. Each component of the management apparatus 10 may be achieved by cloud computing made up of one or more computers, for example. The management apparatus 10, and at least one of the base station 20 and the relay apparatus 30 may be configured as the same apparatus. These management apparatuses are also included in examples of "management apparatuses" of the present disclosure.

Note that the present disclosure is not limited to the embodiments described above, and can be appropriately changed in a range without departing from the gist.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A control apparatus, comprising:
   a processor coupled to a memory storing instructions, the processor being configured to:
      identify a first user whose network usage frequency is less than a threshold and a second user whose network usage frequency is equal to or higher than a threshold, based on the usage frequency of the network;
   receive an access request transmitted from the first user;
   analyze whether the second user approves the access request by the first user or not; and
   permit access by the first user to the network in a case where the access request by the first user is approved by a specific number or more of the second users, the specific number being two or more.

2. The control apparatus according to claim 1, wherein the processor is further configured to receive an access termination request transmitted by the first user, and
   wherein, in a case where the access termination request is received by the processor, the processor denies the access by the first user to the network.

3. The control apparatus according to claim 1, wherein in at least one case between a case where the access request by the first user is approved by the specific number or more of the second users, and a case where the access request by the first user is approved by a user registered as an administrator, the processor permits the access by the first user to the network.

4. The control apparatus according to claim 3, wherein in a case where the access request by the first user is approved by less than the specific number of second users, the processor notifies the first user of information indicating the at least one second user having approved the access request by the first user.

5. The control apparatus according to claim 1, wherein the processor is further configured to authorize at least one user whose use frequency of the network is equal to or higher than the threshold, as the second user, based on an access history of the user.

6. A control method, comprising:
- identifying a first user whose network usage frequency is less than a threshold and a second user whose network usage frequency is equal to or higher than a threshold, based on the usage frequency of the network;
- receiving an access request transmitted from the first user;
- analyzing whether the second user approves the access request by the first user or not; and
- permitting access by the first user to the network in a case where access by the first user is approved by a specific number or more of the second users, the specific number being two or more.

\* \* \* \* \*